US010025233B2

(12) United States Patent
Yoshida

(10) Patent No.: US 10,025,233 B2
(45) Date of Patent: Jul. 17, 2018

(54) ELECTROCONDUCTIVE MEMBER AND ELECTROPHOTOGRAPHIC APPARATUS

(71) Applicant: CANON KABUSHIKI KAISHA, Tokyo (JP)

(72) Inventor: Toshiyuki Yoshida, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 191 days.

(21) Appl. No.: 15/141,598

(22) Filed: Apr. 28, 2016

(65) Prior Publication Data

US 2016/0320726 A1 Nov. 3, 2016

(30) Foreign Application Priority Data

Apr. 30, 2015 (JP) ................................ 2015-093505

(51) Int. Cl.
*B32B 9/04* (2006.01)
*G03G 15/16* (2006.01)
*G03G 15/02* (2006.01)

(52) U.S. Cl.
CPC ....... *G03G 15/162* (2013.01); *G03G 15/0233* (2013.01); *G03G 15/1685* (2013.01)

(58) Field of Classification Search
None
See application file for complete search history.

(56) References Cited

U.S. PATENT DOCUMENTS 3,248,279 A * 4/1966 Geyer .................. C08G 61/121 162/138
2007/0207186 A1 * 9/2007 Scanlon .................... A61F 2/07 424/424
2010/0078596 A1 * 4/2010 Sonobe .............. C08G 73/1067 252/500

FOREIGN PATENT DOCUMENTS

JP 2003-5531 A 1/2003

* cited by examiner

*Primary Examiner* — John J Figueroa
(74) *Attorney, Agent, or Firm* — Canon U.S.A., Inc. IP Division

(57) ABSTRACT

An electroconductive member is provided which has an electric resistance unlikely to be much decreased even by use over a long time, wherein the electroconductive member includes a resin layer containing a thermoplastic resin, a conducting filler, and a diaryl ether compound having a specific structure.

9 Claims, 1 Drawing Sheet

ELECTROCONDUCTIVE MEMBER AND ELECTROPHOTOGRAPHIC APPARATUS

BACKGROUND

Field of the Disclosure

The present disclosure relates to an electroconductive member and an electrophotographic apparatus.

Description of the Related Art

Electrophotographic image forming apparatuses (hereinafter referred to as electrophotographic apparatus), such as copy machines and laser beam printers, include a semiconductive electroconductive member, such as a charging belt, a charging roller, an intermediate transfer belt, and a transfer roller. As one of such electroconductive members, an electroconductive member including an electroconductive resin layer made of a thermoplastic resin containing a conducting filler, such as carbon black, has been devised.

Japanese Patent Laid-Open No. 2003-5531 discloses an intermediate transfer member made of a resin composition containing a conducting agent having a pH of 5.0 or less in the form of aggregates having grain sizes of 5 μm or more with a density in number of 5 or less per unit area (0.1 $mm^2$). According to this disclosure, the conducting agent is present in a highly dispersed state in the intermediate transfer member, and consequently, the intermediate transfer member exhibits a belt resistance that is not decreased by transfer voltage and an improved uniform electric resistance that is independent of the electric field and does not vary much depending on the environment.

SUMMARY

An aspect of the present disclosure is directed to providing an electroconductive member having an electric resistance that is unlikely to decrease much even when used over a long time. Another aspect of the present disclosure is directed to providing an electrophotographic apparatus that can stably form high-quality images.

According to one aspect of the present disclosure, there is provided an electroconductive member including a resin layer containing a thermoplastic resin, a conducting filler, and a diaryl ether compound represented by the following formula (1):

$$Ar1\text{-}O\text{—}Ar2 \quad (1)$$

In formula (1), Ar1 and Ar2 each represent a group selected from the group consisting of unsubstituted aryl groups having a carbon number of 6 to 12 and aryl groups having a carbon number of 6 to 12 substituted by an electron-donating group.

According to another aspect of the present disclosure, there is provided an electrophotographic apparatus including an electrophotographic photosensitive member, an intermediate transfer member to which an unfixed toner image formed on the electrophotographic photosensitive member is to be primarily transferred, and a secondary transfer device configured to secondarily transfer the transferred toner image on the intermediate transfer member to a recording medium. The intermediate transfer member is defined by the electroconductive member.

Further features of the present disclosure will become apparent from the following description of exemplary embodiments with reference to the attached drawings.

DESCRIPTION OF THE EMBODIMENTS

Figure 1:
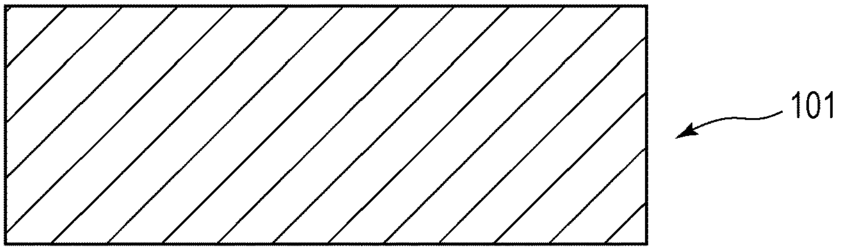
FIG. 1 is a schematic sectional view of an electroconductive member according to an embodiment of the present disclosure.

The above-cited Japanese Patent Laid-Open No. 2003-5531 discloses a method for producing an intermediate transfer member concerned with the present disclosure. In this method, the operation of dispersing the conducting agent in the resin composition is performed twice.

Unfortunately, this operation performed twice increases the manufacturing cost of the intermediate transfer member.

The present inventors have realized that another solution, apart from the solution or method disclosed in the above-cited patent document of highly dispersing a filler, is required for reducing the decrease in electric resistance of the electroconductive member resulting from the use of thereof over a long time.

Accordingly, the present inventors have studied this issue and have found that the electric resistance of an electroconductive member including a resin layer containing an conducting filler and a diaryl ether compound having a specific structure is irrespective of the degree of the dispersion of the conducting filler and unlikely to be much decreased even by use over a long time.

Furthermore, the present inventors have found that an electroconductive member including a resin layer containing a thermoplastic resin, a conducting filler, and a diaryl ether compound represented by the following formula (1) can solve the above issue.

$$Ar1\text{-}O\text{—}Ar2 \quad (1)$$

In formula (1), Ar1 and Ar2 each represent a group selected from the group consisting of unsubstituted aryl groups having a carbon number of 6 to 12 and aryl groups having a carbon number of 6 to 12 substituted by an electron-donating group.

Paragraph [0006] in the cited document Japanese Patent Laid-Open No. 2003-5531 describers the case of intermediate transfer members made of a resin composition in which a conducting agent such as carbon black is unevenly dispersed. According to this description, the resin component around the conductive portion of the intermediate transfer is deteriorated by electric field concentration caused by transfer voltage. This deterioration probably reduces the surface resistivity of the unevenly dispersed carbon black particles, and such unevenly dispersed carbon black particles locally form a conductive portion on which electric field is concentrated.

Also, the present inventors found through their study that an electroconductive member including a resin layer having a dense portion where the conducting filler is present with a high density in the resin and a sparse portion where the conducting filler is sparse causes an applied voltage to concentrate on the dense portion and thus to degrade or carbonize the resin around the conducting filler. The inventors therefore think that this causes conductive paths to be formed among particles of the conducting filler. Thus, it is thought that, in electroconductive members including a resin layer having a dense portion where the conducting filler is present in the resin with a high density and a sparse portion where the conducting filler is sparse, the electric resistance is likely to decrease.

The diaryl ether compound represented by formula (1) according to the present disclosure has aryl groups having a π electron conjugated system on both sides of the oxygen atom. Thus, the molecule of the diaryl ether compound has a polarized structure in which the density of the π electrons is increased around the oxygen atom. The present inventors therefore think that when a voltage is applied to the electroconductive member, part of the current flowing in the electroconductive member flows in the direction from the high electron density portion to the low electron density portion in the molecule of the diaryl ether compound. Consequently, the voltage locally concentrated on the thermoplastic resin is reduced. It is therefore expected that the resin component will be unlikely to deteriorate or carbonize and thus achieve an electroconductive member whose electric resistance does not decrease much. The electric resistance of the electroconductive member is expected to be unlikely to decrease much even if the conducting filler is insufficiently dispersed in the resin layer.

The subject matter of the present disclosure will be further described in detail with reference to exemplary embodiments.

Diaryl Ether Compound

The diaryl ether compound used herein is represented by the following formula (1):

Ar1-O—Ar2 (1)

In formula (1), Ar1 and Ar2 each represent a group selected from the group consisting of unsubstituted aryl groups having a carbon number of 6 to 12 and aryl groups having a carbon number of 6 to 12 substituted by an electron-donating group.

Exemplary groups represented by Ar1 and Ar2 include phenyl and naphthyl. The phenyl group is particularly advantageous. Ar1 and Ar2 may be the same or different.

If Ar1 or Ar2 has a substituent, the substituent is an electron-donating group. The electron-donating group is effective in increasing the electron density of the π electron conjugated system of the aryl groups, thus polarizing the molecule. The electron-donating group may be at least one group selected from the group consisting of hydroxy, alkoxy having a carbon number of 1 to 6, amino, alkyl having a carbon number of 1 to 6, alkylamino having a carbon number of 1 to 6, and dialkylamino having a total carbon number of 2 to 12. The carbon number of the alkoxy group and the alkyl group may preferably be in the range of 1 to 3. The carbon number of the alkyl group in the alkylamino group and the dialkylamino group may preferably have a number of carbon in the range of 1 to 3. The substituents of Ar1 and Ar2 may be the same or different.

The electron-donating group may be substituted at the ortho, the meta, or the para position of each aryl group. Advantageously, the substituent or electron-donating group is present at the para or meta position, particularly at the para position opposite to the oxygen atom. This structure enables the π electron conjugated system to be polarized in the molecule as a whole. The number of electron-donating groups substituted on one aryl group may be 1 to 5. In an advantageous structure, one to three substituents may be present at the meta and/or para positions.

Examples of the diaryl ether compound represented by formula (1) include diphenyl ether, 4-aminodiphenyl ether, 4,4'-diaminodiphenyl ether, 3,4'-diaminodiphenyl ether, 4-hydroxydiphenyl ether, 4,4'-dihydroxydiphenyl ether, 4-methoxydiphenyl ether, 4,4'-dimethoxydiphenyl ether, 2,4'-dimethyldiphenyl ether, 4-methoxy-4'-methyldiphenyl ether, 2-amino-2'-methyldiphenyl ether, and 4-dimethylamino-4'-methylaminodiphenyl ether.

Compound represented by the following formula (2) are advantageous:

(2)

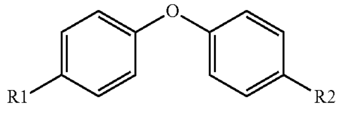

In formula (2), R1 and R2 each represent an atom or a group selected from the group consisting of hydrogen, hydroxy, alkoxy having a carbon number of 1 to 6, amino, alkyl having a carbon number of 1 to 6, alkylamino having a carbon number of 1 to 6, and dialkylamino having a total carbon number of 2 to 12. More specifically, R1 and R2 are desirably selected from the group consisting of hydrogen, hydroxy, methoxy, ethoxy, amino, methyl, ethyl, methylamino, and dimethylamino.

The proportion of the diaryl ether compound contained is desirably in the range of 0.5 ppm to 5000 ppm, such as in the range of 5 ppm to 1000 ppm, relative to the total mass of the thermoplastic resin, the conducting filler, and the diaryl ether compound. When the proportion of the diaryl ether compound is in such a range, the electric resistance is unlikely to be much decreased even by repetitive voltage application. The content of the diaryl ether compound can be measured by gas chromatography-mass spectrometry (GC/MS) analysis. The detail of the GC/MS analysis will be described in Examples.

Thermoplastic Resin

The thermoplastic resin is at least one resin selected from the group consisting of polyethylene, polypropylene, polyacetal, polyamide, polyamideimide, polycarbonate, polybutylene naphthalate, polyvinylidene fluoride, polyether ether ketone, polyphenylene sulfide, and polyimide.

Advantageously, the thermoplastic resin has one or both of the structures represented by the following formulas (3) and (4) in the structural unit thereof.

(3)

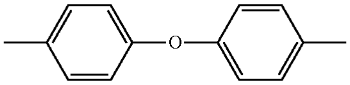

(4)

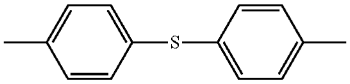

Since these structures are similar to the molecule of the diaryl ether compound, that is, a structure in which two aryl groups are connected with an atom therebetween, the thermoplastic resin is miscible with the diaryl ether compound. Accordingly, the diaryl ether compound is expected to satisfactorily disperse in the thermoplastic resin and thus to reduce the decrease in electric resistance of the resulting electroconductive member effectively. Such thermoplastic resins include polyether ether ketone (PEEK), polyphenylene sulfide (PPS), and polyimide (PI). Advantageously, at least either PEEK or PPS is used. These resins facilitate the production of the electroconductive member.

Various types and grades of PEEK and PPS are commercially available. These thermoplastic resins in various grades may be used singly or in combination.

PEEK may be selected from Victrex PEEK series produced by Victrex including PEEK 450G, 381G, and 151G.

PPS may be selected from TORELINA series produced by Toray including TORELINA A-900, A670X01, and A756MX02, and Super tough PPS series, Glass fiber reinforced PPS series, mineral filled reinforced PPS series, and Alloy and modified PPS series, each produced by DIC.

Conducting Filler

The conducting filler can be selected from among a variety of known materials used as a conducting filler. Exemplary materials used as a conducting filler include conducting carbons, such as carbon black, acid carbon black whose surface has been oxidized, carbon nanotube, carbon nanofiber, and graphite; metal oxides, such as titanium oxide, zinc oxide, tin oxide, magnesium oxide, aluminum oxide, antimony-doped tin oxide, and indium-doped tin oxide; metal salts, such as potassium titanate, lithium perchlorate, and lithium hexafluoroantimonate; and conductive polymers which may be in the form of powder, such as polyaniline, polypyrrole, and polyacetylene.

Conductive carbons are advantageous as the conducting filler. Carbon black is particularly advantageous. Carbon black is inexpensive and is useful for controlling the electric conductivity because it is unlikely to bleed out much.

Examples of the carbon black include Ketjen black, furnace black, acetylene black, thermal black, and gas black. Acetylene black is more advantageous. Acetylene black contains little impurities, and the use thereof allows easy production of the electroconductive member having a desired conductivity. Commercially available acetylene blacks include Denka Black series (produced by Denka), Mitsubishi Conductive Carbon Black series (Mitsubishi Chemical, VULCAN series produced by Cabot, Printex series produced by Degussa, and SRF produced by Asahi Carbon.

The proportion of the conducting filler contained is desirably in the range of 5 parts to 40 parts by mass, such as in the range of 5 parts to 30 parts by mass, relative to 100 parts by mass of the thermoplastic resin. When the proportion of the conducting filler is in such a range, the resulting electroconductive member has an electric resistance in a desired range and exhibits a satisfactory mechanical strength.

Electroconductive Member

FIG. 1 is a schematic sectional view of an electroconductive member according to an embodiment of the present disclosure. In the electroconductive member 101 shown in FIG. 1, the conducting filler and the diaryl ether compound represented by the formula (1) are dispersed in the thermoplastic resin. Incidentally, it should be appreciated that the electroconductive member is not limited to the structure shown in Table 1.

The electroconductive member may be manufactured in the following process. Pellets of the raw material that is a thermoplastic resin, a conducting filler, and a diaryl ether compound are mixed together. The mixture is subjected to melt-kneading in a melt-kneader and is formed into pellets of an electroconductive resin composition used as the raw material. The pellets of the electroconductive resin composition are melted in a single-screw extruder. The melted composition is extruded through a cylindrical slit disposed on an end of the extruder and then cooled on a cylindrical cooling mandrel.

Since the diaryl ether compound in the mixture can be volatilized while the mixture is being melt-kneaded, the diaryl ether compound content in the mixture is desirably set higher than the desired content in the resulting electroconductive member. More specifically, the proportion of the diaryl ether compound in the mixture is desirably in the range of 0.001 part to 6.0 parts by mass relative to 100 parts by mass of the thermoplastic resin. By setting the proportion of the diaryl ether compound to the thermoplastic resin to 0.001 part by mass or more, the resulting electroconductive member can has a sufficient diary ether content. Also, the diaryl ether compound content in the mixture is desirably 6.0 parts by mass or less. If the mixture contains a large amount of diaryl ether compound, the ether compound is likely to volatilize undesirably into gas during melt kneading.

The melt kneading is performed typically at a temperature higher than or equal to the glass transition temperature of the thermoplastic resin, at which the resin does not decompose. For example, if PEEK is used as the thermoplastic resin, the melt kneading temperature can be in the range of 310° C. to 410° C. If PPS is used as the thermoplastic resin, the melt kneading temperature can be in the range of 200° C. to 340° C.

The electroconductive member may be formed by blow molding.

If the electroconductive member is used as an intermediate transfer member, the volume resistivity of the electroconductive member is desirably in the range of $1.0\times10^{3}$ Ωcm to $1.0\times10^{14}$ Ωcm, such as in the range of $1.0\times10^{5}$ Ωcm to $1.0\times10^{13}$ Ωcm. It is also desirable that the ratio of the surface resistivity to the volume resistivity (surface resistivity/volume resistivity) be in the range of 1 to 1000.

The thickness of the electroconductive member is desirably in the range of 40 μm to 120 μm.

The surface of the electroconductive member may be coated. More specifically, a solution of a UV-curable resin and a conductivity control agent in an organic solvent may be applied onto the surface of the electroconductive member by slit coating. After the organic solvent is removed by drying, the coating is irradiated with UV light to form a surface layer. The surface of the electroconductive member may be treated, for example, by lapping for forming small irregularities in the surface with an abrasive paper, or by heating the electroconductive member placed in a cylindrical inner mold to a temperature higher than or equal to the glass transition temperature of the resin and pressing the electroconductive member against a cylindrical outer mold to correct the surface profile.

Electrophotographic Apparatus

There will now be described an electrophotographic apparatus according to an embodiment in which the electroconductive member of an embodiment of the present disclosure is used as the intermediate transfer member (intermediate transfer belt).

Figure 2:
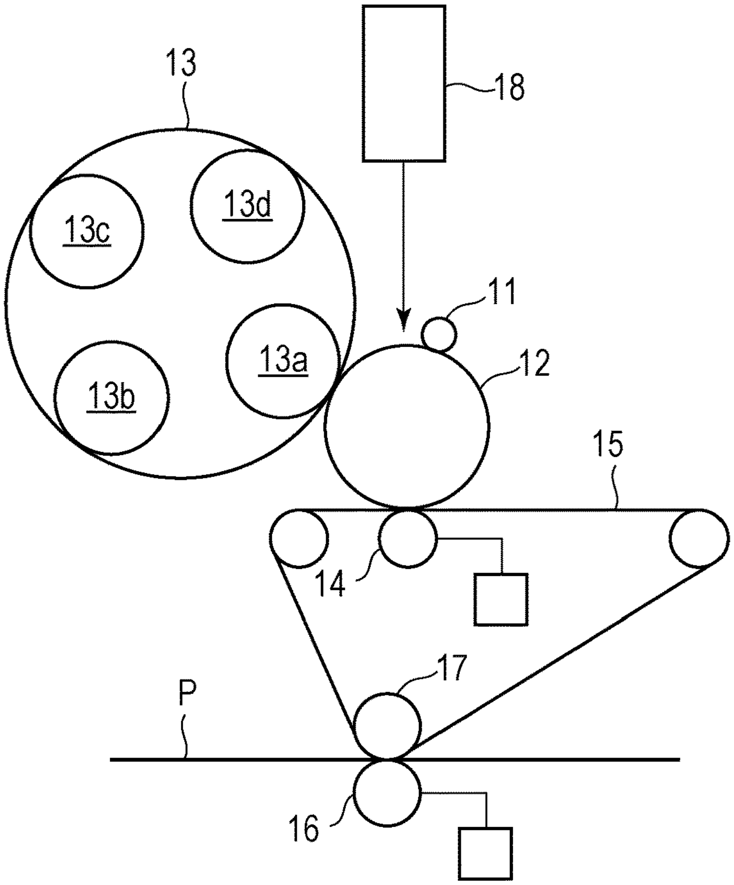
FIG. 2 is a schematic sectional view of an electrophotographic apparatus according to an embodiment of the present disclosure.

In the electrophotographic apparatus as shown in FIG. 2 including an intermediate transfer belt 15, a photosensitive member (electrophotographic photosensitive member) 12 uniformly charged by a charging device 11 is exposed to light, such as a laser beam, emitted from an exposure device 18, and thus an electrostatic latent image is formed. Charged toners from four color developing units 13 (yellow 13*a*, magenta 13*b*, cyan 13*c*, and black 13*d*) are held on the photosensitive member 12, and thus unfixed toner images are formed one after another. The toner images formed on the photosensitive member 12 receive a transfer bias between a primary transfer roller 14 and the photosensitive member 12 that are in contact with each other, thereby being transferred to the intermediate transfer belt 15 so as to be superposed one after another (primary transfer). The four-color toner image thus formed on the intermediate transfer belt 15 is transferred at one time to the transfer paper (recording medium) P between a secondary transfer roller 16 and a counter roller 17 opposing the secondary transfer roller that are in contact with each other, thus forming an image (secondary transfer).

Incidentally, it should be appreciated that the structure of the electrophotographic apparatus is not limited to that described in the present embodiment.

According to an embodiment of the present disclosure, an electroconductive member is provided which has an electric resistance that is unlikely to decrease much even when used over a long time. According to another aspect of the present disclosure, an electrophotographic apparatus is provided which can stably form high-quality images.

EXAMPLES

Examples of the electroconductive member according to the present disclosure will be described below. The electroconductive member of the disclosure is not limited to the following Examples.

Example 1

Production of Electroconductive Member

With 100 parts by mass of PEEK (Victrex PEEK 381G produced by Victrex) were mixed 25 parts by mass of carbon black (acetylene black: Denka Black produced by Denka) and 0.002 part by mass of diphenyl ether (produced by Wako Pure Chemical Industries). The mixture was melt-kneaded to prepare an electroconductive resin composition and formed into pellets by using a continuous twin screw extruder TEX 30α manufactured by Japan Steel Works. The melt kneading temperature was controlled in the range of 350° C. to 380° C. Subsequently, the resulting pellets of the electroconductive resin composition were introduced into a single screw extruder set to 380° C. and the resin composition was melted therein and extruded from a circular die thereof. The extruded resin composition was cooled and solidified on a cylindrical cooling mandrel to yield an electroconductive member.

Evaluation of Electroconductive Member

Conductivity of Electroconductive Member

The surface resistivity and volume resistivity of the resulting electroconductive member were measured for evaluating the conductivity. A ring probe (URS probe, manufactured by Mitsubishi Chemical, internal electrode outer diameter: 5.9 mm, external electrode inner diameter: 11.0 mm, external electrode outer diameter: 17.8 mm) and a measurement stage (Resitable UFL manufactured by Mitsubishi Chemical) were connected to a resistivity meter (Hiresta UP manufactured by Mitsubishi Chemical). The surface resistivity and the volume resistivity of the sample were measured by applying a voltage of 100 V to the sample disposed between the probe and the measurement stage for 10 seconds while a pressure of about 2 kgf was placed on the sample.

Content of Diaryl Ether Compound

The content of the diaryl ether compound in the resulting electroconductive member was measured by thermal desorption gas chromatography-mass spectrometry (GC/MS). A sample (20 mg) of several millimeters on each side cut out of the electroconductive member was heated, and gas released from the sample was collected. The collected gas was subjected to analysis under the following conditions for determining the content of the diaryl ether compound in the sample.

(i) Conditions for Collecting Desorbed Gas

Heating temperature: 330° C.

Heating time: 15 min

Heating atmosphere: He, 50 mL/min

Trapping agent: GC packed column packing material Tenax-GR, mesh 20/35 (available from GL Sciences)

(ii) Conditions for Thermal Desorption

Thermal desorption apparatus: JTD-505 II (manufactured by Japan Analytical Industry)

Primary desorption conditions: desorption at 260° C., trapping at 60° C. for 15 minutes Secondary desorption conditions: trapping at 280° C. for 180 seconds (iii) GC/MS Measurement Conditions GC: HP 6890 (manufactured by Agilent)

MS: JMS-SX 102A (manufactured by JEOL)

Column: J&W DB-5MS, 30 m×0.25 mm (ID), thickness 0.5 μm (manufactured by Agilent Technology)

Column temperature profile: from 60° C. (5 min) to 300° C. (25 min kept), heating rate 8° C./min Ionization: electron ionization (EI)

Carrier gas: He, 1.5 mL/min (split ratio=30:1)

Ion source temperature: 250° C.

TIC mass range: m/z=29 to 500

Durability Test

The changes in electric resistance with time of the electroconductive member were measured. The electroconductive member was installed as a transfer belt in the intermediate transfer unit of a copy machine (IR-ADVANCE C5051 manufactured by Canon), and paper feed running test was performed for durability of the electroconductive member. The paper feed running test was performed under the conditions at a temperature of 15° C. and a humidity of 10% RH, by printing a magenta solid pattern on 600 thousand A4 sheets (GF-600 manufactured by Canon, basis weight: 60 $g/m^2$).

After the paper feed running test, the same pattern was further printed on 20 sheets for checking the printed images formed using the entire periphery of the intermediate transfer belt. The printed images on the 20 sheets were visually checked for unevenness in image density, which is an image defect. The result was rated according to the following criteria. Table 2 shows the results of the evaluations.

Rank A: There was no unevenness in image density in any image.

Rank B: there was some unevenness in image density in at least one image.

Examples 2 to 8, Comparative Examples 1 to 2

Electroconductive members were produced in the same manner as in Example 1, using the materials and proportions shown in Table 1. In Example 8, in which PPS was used as the thermoplastic resin, melt kneading was performed in the temperature range of 290° C. to 330° C.

The PPS resin shown in Table 1 was TORELINA produced by Toray. For the diaryl ether compounds shown in Table 1, diphenyl ether and 4,4'-diaminodiphenyl ether were products of Kishida Chemical; and 4,4'-dihydroxydiphenyl ether, 4-methoxydiphenyl ether, and 3,4-dichlorodiphenyl ether were products of Tokyo Chemical Industry.

TABLE 1

| | Thermoplastic resin | | Electroconductive carbon | | Diaryl ether compound | |
|---|---|---|---|---|---|---|
| | Material | Proportion (part(s) by mass) | Material | Proportion (part(s) by mass) | Material | Proportion (part(s) by mass) |
| Example 1 | PEEK | 100 | CB | 25 | Diphenyl ether | 0.002 |
| Example 2 | | | | | | 0.01 |
| Example 3 | | | | | | 1.2 |
| Example 4 | | | | | | 5.6 |
| Example 5 | | | | | 4,4'-Diaminodiphenyl ether | 0.06 |
| Example 6 | | | | | 4,4'-Dihydroxydiphenyl ether | 0.06 |
| Example 7 | | | | | 4-Methoxydiphenyl ether | 0.06 |
| Example 8 | PPS | 100 | CB | 22 | Diphenyl ether | 1.2 |
| Comparative Example 1 | PEEK | 100 | CB | 22 | 3,4-Dichlorodiphenly ether | 0.06 |
| Comparative Example 2 | PEEK | 100 | CB | 22 | — | 0 |

The resulting electroconductive members were evaluated in the same manner as in Example 1. The results are shown in Table 2.

TABLE 2

| | | Volume resistivity (Ω · cm) | | Surface resistivity (Ω/square) | | Image detect |
|---|---|---|---|---|---|---|
| | Diphenyl ether compound content (ppm) | Before durability test | After durability test | Before durability test | After durability test | due to uneven density |
| Example 1 | 2 | 1.30E+10 | 8.50E+09 | 1.50E+12 | 3.10E+11 | Rank A |
| Example 2 | 7 | 1.50E+10 | 7.20E+09 | 1.50E+12 | 1.90E+11 | Rank A |
| Example 3 | 950 | 9.80E+09 | 5.50E+09 | 9.50E+11 | 3.50E+11 | Rank A |
| Example 4 | 4650 | 1.10E+10 | 6.50E+09 | 1.00E+12 | 1.50E+11 | Rank A |
| Example 5 | 42 | 1.70E+10 | 5.30E+09 | 2.30E+12 | 9.10E+11 | Rank A |
| Example 6 | 65 | 9.00E+09 | 1.80E+09 | 1.90E+12 | 2.10E+11 | Rank A |
| Example 7 | 30 | 1.10E+10 | 1.50E+09 | 1.50E+12 | 5.50E+11 | Rank A |
| Example 8 | 38 | 1.20E+10 | 3.49E+09 | 1.30E+12 | 3.00E+11 | Rank A |
| Comparative Example 1 | 33 | 8.50E+09 | 3.00E+07 | 1.90E+12 | 5.50E+09 | Rank B |
| Comparative Example 2 | 0 | 2.20E+10 | 3.00E+07 | 1.50E+12 | 8.00E+07 | Rank B |

It was confirmed that the electroconductive members of Examples 1 to 8 did not produce image defects or unevenness in image density and exhibited reduced changes in electric resistance even after the paper feed running test performed on 600 thousand sheets.

The electroconductive members of Comparative Examples 1 and 2 produced images having uneven density. In Comparative Example 1, a diaryl ether compound substituted by an electron-withdrawing functional group was used. This diaryl ether compound does not polarize and therefore cannot sufficiently reduce the electrical load to the thermoplastic resin. This is probably the reason why the change in conductivity by a long time use cannot be sufficiently reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-093505 filed Apr. 30, 2015, which is hereby incorporated by reference herein in its entirety.

What is claimed is:

1. An electroconductive member comprising a resin layer containing:

a thermoplastic resin;

a conducting filler; and a diaryl ether compound represented by the following formula (1):

$$Ar1\text{-}O\text{—}Ar2 \quad (1)$$

wherein in formula (1), Ar1 and Ar2 each represent a group selected from the group consisting of unsubstituted aryl groups having a carbon number of 6 to 12 and aryl groups having a carbon number of 6 to 12 substituted by an electron-donating group.

2. The electroconductive member according to claim 1, wherein the electron-donating group is at least one group selected from the group consisting of hydroxy, alkoxy having a carbon number of 1 to 6, amino, alkyl having a carbon number of 1 to 6, alkylamino having a carbon number of 1 to 6, and dialkylamino having a total carbon number of 2 to 12.

3. The electroconductive member according to claim 1, wherein the diaryl ether compound is represented by the following formula (2):

(2)

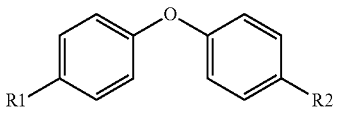

wherein in formula (2), R1 and R2 each represent an atom or a group selected from the group consisting of hydrogen, hydroxy, alkoxy having a carbon number of 1 to 6, amino, alkyl having a carbon number of 1 to 6, alkylamino having a carbon number of 1 to 6, and dialkylamino having a total carbon number of 2 to 12.

4. The electroconductive member according to claim 1, wherein the thermoplastic resin has at least one of the structures represented by the following formulas (3) and (4) in the structural unit thereof:

(3)

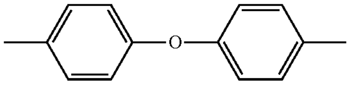

-continued (4)

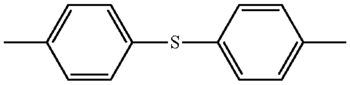

5. The electroconductive member according to claim 1, wherein the thermoplastic resin is selected from the group consisting of polyether ether ketone, polyphenylene sulfide, and polyimide.

6. The electroconductive member according to claim 1, wherein the proportion of the diaryl ether compound is in the range of 0.5 ppm to 5000 ppm relative to the total mass of the thermoplastic resin, the conducting filler, and the diaryl ether compound.

7. The electroconductive member according to claim 1, wherein the conducting filler is a conducting carbon.

8. The electroconductive member according to claim 7, wherein the conducting carbon is acetylene black.

9. The electroconductive member according to claim 1, wherein the proportion of the conducting filler is in the range of 5 parts to 40 parts by mass relative to 100 parts by mass of the thermoplastic resin.

* * * * *